United States Patent
Liang et al.

(10) Patent No.: US 8,103,397 B2
(45) Date of Patent: Jan. 24, 2012

(54) METHOD FOR OPTIMIZING POWERTRAIN EFFICIENCY FOR A VEHICLE

(75) Inventors: Wei Liang, Farmington Hills, MI (US);
Qing Wang, Canton, MI (US);
Xiaoyong Wang, Canton, MI (US);
Joseph Gerald Supina, Saline, MI (US);
Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 12/797,964

(22) Filed: Jun. 10, 2010

(65) Prior Publication Data
US 2011/0172865 A1  Jul. 14, 2011

(51) Int. Cl.
*G05D 3/00* (2006.01)
(52) U.S. Cl. .................. 701/22; 903/903; 180/65.265
(58) Field of Classification Search .................. 701/10, 701/22; 903/903; 180/65.265, 65.275; 236/74 R
See application file for complete search history.

(56) References Cited

U.S. PATENT DOCUMENTS

| | | | | |
|---|---|---|---|---|
| 5,176,213 A * | 1/1993 | Kawai et al. | .................. | 180/243 |
| 6,394,208 B1 * | 5/2002 | Hampo et al. | ............. | 180/65.25 |
| 7,374,003 B1 * | 5/2008 | Fernandez | .................. | 180/65.8 |
| 7,398,147 B2 | 7/2008 | Kozarekar et al. | | |
| 7,576,501 B2 * | 8/2009 | Okubo et al. | .................. | 318/139 |

* cited by examiner

*Primary Examiner* — Gertrude Arthur Jeanglaude
(74) *Attorney, Agent, or Firm* — David R. Kelley; Brooks Kushman P.C.

(57) ABSTRACT

A vehicle powertrain includes an engine, an electric machine operable to output torque to at least one vehicle wheel, and an electric power source operable to provide electric power to the electric machine. A method for optimizing powertrain efficiency includes generating a plurality of three-dimensional maps of optimized engine speeds for combinations of vehicle power and vehicle speed at a plurality of predetermined powers of the electrical power source. Each of the maps corresponds to one of the predetermined powers of the electrical power source. The maps are used to determine an optimized engine speed for a given power of the electrical power source, a given vehicle power and a given vehicle speed.

19 Claims, 3 Drawing Sheets

METHOD FOR OPTIMIZING POWERTRAIN EFFICIENCY FOR A VEHICLE

TECHNICAL FIELD

The present invention relates to a method for optimizing powertrain efficiency for a vehicle.

BACKGROUND

Vehicles having a series-parallel hybrid electric vehicle powertrain have two power sources for delivering driving power to vehicle traction wheels. In general, these power sources may be divided into two broad categories: mechanical and electrical. A mechanical power source may include, for example, an internal combustion engine that outputs mechanical power to the vehicle wheels through one or more sets of transmission gears. An electrical power source may include one or more electric machines, such as an electric motor or a motor/generator. The electric motor may receive electrical power from another generator, a battery, or other source of electrical power. The electric motor receives the electrical power from the electrical power source, and outputs mechanical power to the vehicle wheels generally through one or more sets of transmission gears.

Because this type of arrangement provides multiple power flow paths to the vehicle wheels, it may be possible to optimize the use of the various powertrain components to maximize system efficiency for a given driver demand for power. One such power management strategy is described in U.S. Pat. No. 7,398,147 issued on 8 Jul. 2008, which is hereby incorporated herein by reference.

SUMMARY

Embodiments of the present invention include a method for optimizing powertrain efficiency in a vehicle. The powertrain includes an engine, an electric machine operable to output torque to at least one vehicle wheel, and an electrical power source operable to provide electrical power to the electric machine. The method includes the step of generating a plurality of three-dimensional maps of optimized engine speeds for combinations of vehicle power and vehicle speed at a plurality of predetermined powers of the electrical power source. Each of the maps corresponds to one of the predetermined powers of the electrical power source. The method then uses the maps to determine an optimized engine speed for a given power of the electrical power source, a given vehicle power, and a given vehicle speed.

Embodiments of the invention also include a method for optimizing powertrain efficiency in a vehicle, for example, having a powertrain such as described above. The method in these embodiments includes determining a powertrain efficiency as a function of engine speed for one set of values of certain vehicle operating parameters, including a power of the electrical power source. The powertrain efficiency for the one set of values of the certain vehicle operating parameters is maximized, and an optimized engine speed is determined based on the maximized powertrain efficiency.

The one set of values can be the current values of the certain vehicle operating parameters, or they can be a set of values chosen to generate data for a data map. To generate a data map, a powertrain efficiency is determined as a function of engine speed for at least one other set of values of the certain vehicle operating parameters. The powertrain efficiency for the at least one other set of values is maximized. Each of the maximized powertrain efficiencies corresponds to an optimized engine speed for the respective set of values. Current values for the certain vehicle operating parameters are then determined, and the optimized engine speed for the current values of the certain vehicle operating parameters is determined based on the maximized powertrain efficiencies.

Embodiments of the invention also include a method for optimizing powertrain efficiency in a vehicle, having, for example, a powertrain such as described above. Current values of a plurality of vehicle operating parameters are input into a control system of the vehicle. The vehicle operating parameters include a power of the electrical power source. The control system is programmed to output optimized engine speeds corresponding to respective values of the vehicle operating parameters. The optimized engine speed corresponding to the current values of the vehicle operating parameters is output from the control system.

DETAILED DESCRIPTION

Figure 1:
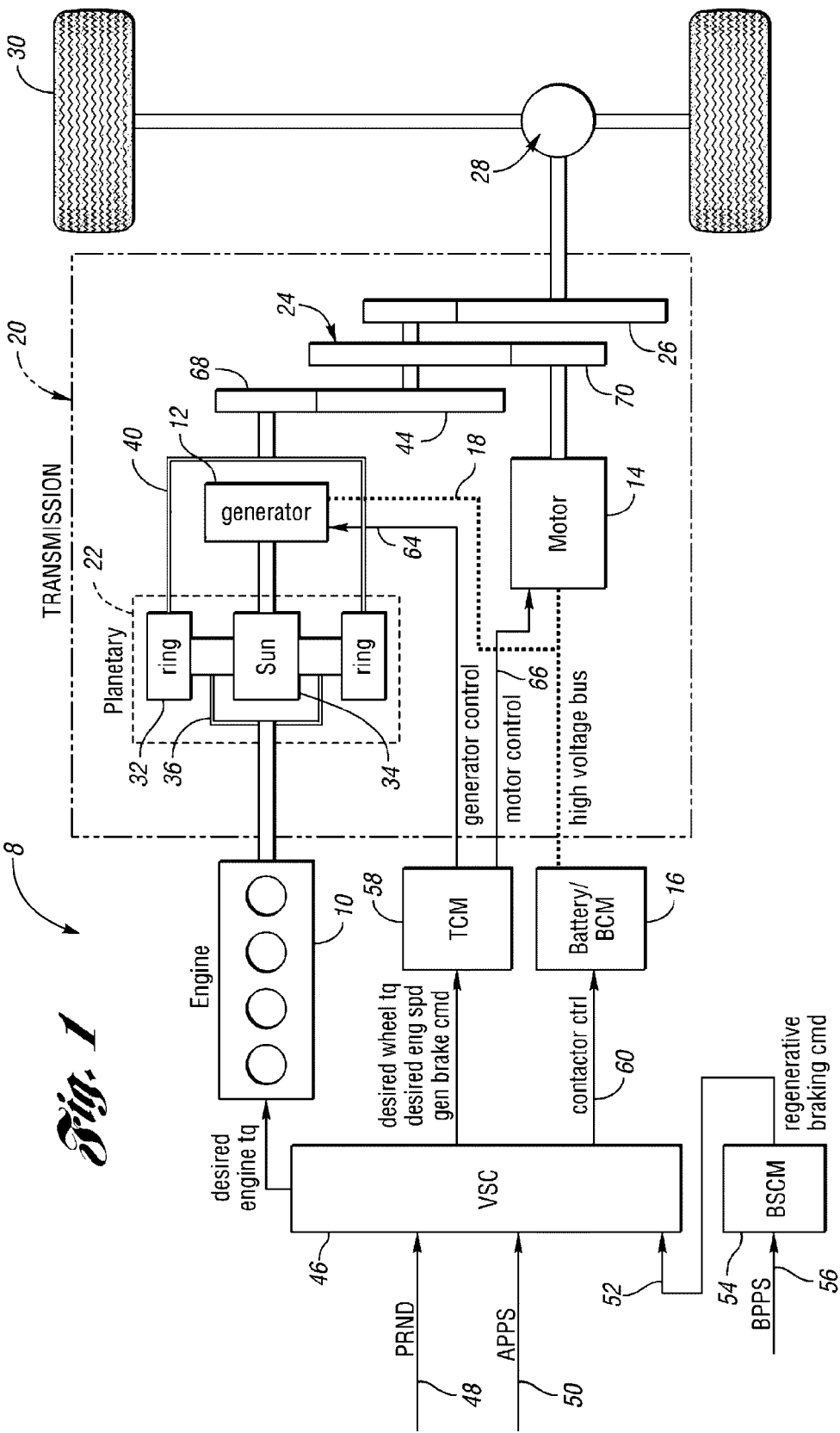
FIG. 1 is a schematic illustration of a series-parallel hybrid electrical vehicle powertrain capable of using the present invention.

FIG. 1 shows a series-parallel hybrid electric vehicle (HEV) powertrain 8. A primary power source in the configuration of FIG. 1 is engine 10. A secondary power source is a combination of a generator 12, an electric machine, or motor 14, an electrical power source and its controller, which in this embodiment is battery and battery control module (battery/BCM) 16. It is understood that different types of electrical power sources could be used to provide electrical power to the motor 14, and further, that a battery controller, such as the BCM, need not be integrated into the battery, but could be a separate device in communication with the battery. These components of the combination are electrically coupled by electrical high voltage bus 18.

The powertrain 8 includes a transmission 20, which comprises a planetary gear set 22, the generator 12 and the motor 14, as well as torque transfer counter shaft gearing 24. A power output gear element of the gearing 24, seen at 26, is drivably connected to a differential-and-axle assembly 28, which distributes power to vehicle traction wheels 30. The planetary gear set 22 comprises a ring gear 32, a sun gear 34, a planetary carrier 36 and planet gears rotatably supported on carrier 36 for engagement with ring gear 32 and sun gear 34.

Sun gear 34 is drivably connected to the rotor of generator 12. A torque flow path is established by torque transfer member 40. The power output shaft for the engine is connected drivably to the carrier 36, as shown at 42. The ring gear 32 is connected through torque transfer member 40 to input gear element 68 of the torque transfer gearing 24. The rotor of motor 14 is drivably connected to gear element 70.

A control system for the powertrain 8 includes an overall controller for the operating modes, which in this embodiment is a vehicle system controller 46 (VSC), which receives various inputs including driver inputs at 48 and 50. The input at 50 is an accelerator pedal position sensor signal (APPS) and the input at 48 is driver gear selection for "park," "reverse," "neutral" or "drive range" (PRND). A regenerative braking command input for the vehicle system controller 46 is shown at 52. The regenerative braking command is issued by a brake system control module 54 (BSCM), which receives a brake demand corresponding to driver vehicle brake pedal position sensor signal 56 (BPPS).

The vehicle system controller 46 issues command signals to a transmission control module 58 (TCM), including a desired wheel torque, a desired engine speed and a generator brake command. It also issues a battery control module contactor control signal to the battery control module 16, as shown at 60. The transmission control module issues a generator control signal to the generator 12 through a signal flow path 64. It issues a motor control signal to the motor 14 through signal flow path 66. In the embodiment shown in FIG. 1, the control system for the powertrain 8 includes the VSC 46, the BSCM 54, the TCM 58 and the BCM portion of the battery/BCM 16; it is understood, however, that embodiments of the present invention may have control systems having fewer or a greater number of controllers, some or all of which may be connected to each other, for example, through a controller area network (CAN).

Figure 2:
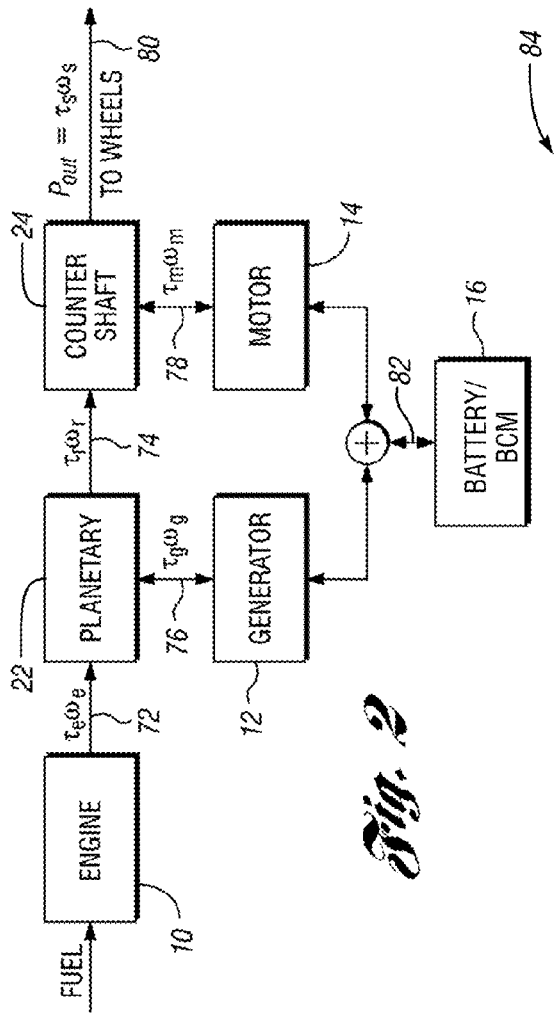
FIG. 2 is a schematic diagram of a power flow in the powertrain of FIG. 1.

FIG. 2 is a power flow diagram for the powertrain 8 illustrated schematically in FIG. 1. There are two power flow paths for the engine to deliver its output power, which is indicated in FIG. 2 at 72. The first power flow path extends from the engine to the carrier 36, to the ring gear 32 and to the countershaft gearing 24. Power transfer from the planetary carrier 36 to the countershaft gearing 24 is shown at 74. The second power flow path is an electrical power flow path 76 from the engine 10 to the generator 12, to the motor 14 and from the motor 14 to the countershaft 24, as shown at 78. The output power to the wheels is shown at 80. As shown in FIG. 2, the electrical power flow path may also include electrical power going to and coming from the battery/BCM 16 as shown at 82.

To appreciate the present invention, relationships between certain vehicle operating parameters, and relationships between certain powertrain elements, are set forth and explained below. Although the powertrain illustrated in FIG. 1 is used for reference, it is understood that the present invention may be used with other mechanical/electrical powertrain configurations. The vehicle operating parameters may include such parameters as power, speed, torque, battery power, etc., values of which can be determined for individual components, such as the engine 10, the generator 12, the motor 14, the battery/BCM 16, or in some instances for the entire vehicle itself. The powertrain elements also have certain known relationships based on their geometries. For example, the planetary gear set 22 has two degrees-of-freedom; therefore, if the speed of any two of the ring gear 32, the sun gear 34, and the carrier 36 are known, the speed of the third can be determined. Similarly, the vehicle speed has a fixed gear ratio to the ring gear speed, and the sun gear speed equals the generator speed.

The vehicle output power ($P_{veh}$) is calculated by the summation of the power on the mechanical path and the output power from the electrical path:

$$P_{veh} = \tau_r \omega_r + \tau_m \omega_m \quad (1)$$

Where
$\tau_r$—ring gear torque (Nm)
$\omega_r$—ring gear speed (rad/s)
$\tau_m$—motor torque (Nm)
$\omega_m$—motor speed (rad/s)

In equation (1), $\tau_r \omega_r$ is the power delivered through the mechanical path, and $\tau_m \omega_m$ is the power delivered through the electrical path. Based on the properties of the planetary gear set 22, the generator efficiency ($\eta_g$—mechanical to electrical) and the motor efficiency ($\eta_m$—electrical to mechanical), equation (1) can be rewritten as follows:

$$P_{veh} = T_{e2r}\tau_e\omega_r + (\tau_g \omega_g \eta_g + P_{bat})\eta_m \quad (2)$$
$$= T_{e2r}\tau_e\omega_r + (T_{e2g}\tau_e\omega_g \eta_g + P_{bat})\eta_m$$

Where
$\tau_e$—engine output torque (Nm)
$\tau_g$—generator torque (Nm)
$\omega_g$—generator speed (rad/s)
$T_{e2r}$—torque ratio from engine to ring gear, $1/(1+\rho)$
$T_{e2g}$—torque ratio from engine to generator, $\rho/(1+\rho)$
$\rho$—the sun gear's number of teeth divided by the ring gear's number of teeth Using $\eta_e$ as the engine efficiency, the system input power $P_{in}$ is:

$$P_{in} = \tau_e \omega_e / \eta_e \quad (3)$$

where $\omega_e$—engine speed (rad/sec)
Then the total system efficiency is $\eta_{total}$ $$\eta_{total} = \frac{P_{veh}}{P_{in}} \quad (4)$$
$$= \eta_e \frac{T_{e2r}\tau_e N_{r2D}\omega_D + (T_{e2g}\tau_e \omega_g \eta_g + P_{bat})\eta_m}{\tau_e \omega_e}$$

where $N_{r2D}$—speed ratio from ring gear to driving shaft
$\omega_D$—wheel speed (rad/s)
Noting that the speed relationship between the engine, the ring gear and the generator is:

$$\omega_e = T_{e2r}\omega_r + T_{e2g}\omega_g \quad (5)$$

with the speed sign convention being chosen as positive when rotating clockwise.

During operation of an HEV having a powertrain such as the powertrain 8 shown in FIG. 1, the actual efficiency, $\eta_{total}$, is determined by vehicle speed, component efficiency—which is a function of component speeds and torques—and the battery power, which is controlled by the 46 VSC.

$$\eta_e = \eta_e(\omega_e, \tau_e)$$
$$\eta_g = \eta_g(\omega_g(\omega_e, \omega_D), \tau_g)$$
$$\eta_m = \eta_m(\omega_D, \tau_D) \quad (6)$$

The system efficiency set forth in equation (4) can be rewritten as the function of subsystems powers $$\eta_{total} = \eta_e \frac{P_r + (P_g \eta_g + P_{bat})\eta_m}{\tau_e \omega_e} \quad (7)$$

At any given wheel speed ($\omega_p$) and wheel power command ($P_{veh}$), the operating point of the engine ($\omega_e, \tau_e$) that delivers the power command will not be unique. Multiple solutions exist but with different system efficiencies. Thus, the efficiency function can be expressed in the form with four arguments:

$$\eta_{total} = \eta_{total}(\omega_D, \omega_e, P_{veh}, P_{bat}) \quad (8)$$

As noted in equation (8), the total powertrain efficiency ($\eta_{total}$) is a function of four vehicle operating parameters, including a power of the electrical power source, which in the illustrated embodiment is the battery/BCM 16. For any given values of vehicle speed, represented in equation (8) by the wheel speed ($\omega_D$), vehicle power ($P_{veh}$), and battery power ($P_{bat}$), there is a value of engine speed ($\omega_e$) that results in a maximized efficiency. This value of the engine speed is an optimized engine speed ($\omega_e^*$) for the given values of the vehicle operating parameters. This concept is expressed in equation form as follows:

$$\omega_e^* = \underset{\omega_e}{\operatorname{argmax}} \eta_{total}(\omega_D, \omega_e, P_{veh}, P_{batt}) \equiv \bar{\eta}*(\omega_D, P_{veh}, P_{bat}) \quad (9)$$

i.e., finding the optimum $\omega_e^*$ that maximizes $\eta_{total}$ at other three given inputs. The optimal function $\bar{\eta}^*$ results from system optimum engine speed determination.

Figure 3:
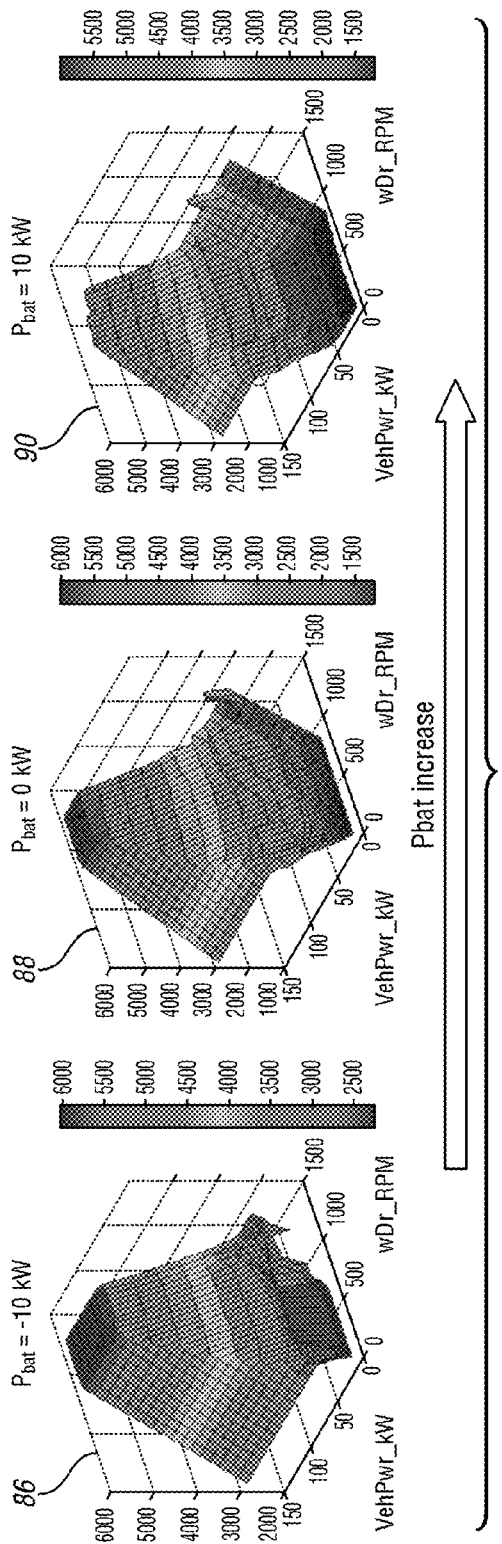
FIG. 3 shows three three-dimensional data maps, which together form a four-dimensional data map, which can be used with the present invention.

In order to utilize this strategy in a vehicle, embodiments of the present invention create four-dimensional data maps or data tables that can be programmed into the control system of the vehicle. FIG. 3 shows one such four-dimensional data map 84. Because it is impracticable to represent four dimensions on a single graph, the four-dimensional data map 84 is made up of a plurality of three-dimensional data maps 86, 88, 90. Each of the data maps 86, 88, 90 has a different predetermined value of battery power ($P_{bat}$); specifically, the map 86 was generated for a battery power of −10 kW, indicating that the battery is charging; the map 88 was generated for a battery power of 0 kW, indicating zero battery power; and the map 90 was generated for a battery power of 10 kW, indicating a battery power output.

It is understood that the battery power values are used for illustrative purposes only, and other values may be used. In general, the range of power values used for maps such as these can be increased for larger capacity batteries, and may be decreased for lower capacity batteries. Moreover, although three maps are used in this example, it may be possible to use less than three, and it may be desirable to use more than three.

By way of illustration, since the axes of each map 86, 88, 90 are the same, the data map 86 includes a rightmost horizontal axis indicating vehicle speed, as represented by the vehicle wheel speed (shown as "wDr_RPM" in FIG. 3, and indicated in the equations as ($\omega_D$)). The leftmost horizontal axis indicates vehicle power (shown as "VehPwr_kW", and indicated in the equations as ($P_{veh}$)). The vertical axis represents the optimized engine speed ($\omega_e^*$), which can be determined when the other three vehicle operating parameters are known.

Embodiments of the present invention generate a plurality of three-dimensional maps, such as the maps 86, 88, 90 for various combinations of vehicle power and vehicle speed at a number of different battery power values. These maps can be generated "offline"—i.e., when the vehicle is not operating, for example, using values of the vehicle operating parameters known to be within the expected operating ranges for the vehicle. The maps are then programmed into the vehicle control system, for example, programmed into the VSC 46. The set of three-dimensional maps, such as the maps 86, 88, 90, form a four-dimensional map, such as the map 84. The four-dimensional map is then used to determine an optimized engine speed for a given power of the battery, a given vehicle power, and a given vehicle speed.

The "given" values are the current values of the vehicle operating parameters, obtained through direct sensor measurements, inferred from other known parameter values, estimated, or by any other method effective to provide the desired values. Using the current or "given" values of the vehicle operating parameters, the four-dimensional map is accessed and the optimized engine speed determined. Because there will be a finite number of three-dimensional maps programmed into the control system, the current values of the vehicle operating parameters may lie between two of the three-dimensional maps, rather than falling directly on one. In such a case, any effective interpolation scheme can be used, and the optimized engine speed determined for the given values.

As described above, embodiments of the invention generated a number of three-dimensional map to create a four-dimensional map programmed into a vehicle control system. Embodiments of the invention may achieve a similar result by employing an algorithm that executes certain of the equations set forth above. For example, equation 7 may be used to determine a powertrain efficiency as a function of engine speed for one set of values of vehicle operating parameters, such as vehicle speed, vehicle power and battery power (as describe above, each of these vehicle operating parameters is itself in equation (7) or can be used to determine the related variable in equation (7)). After determining the powertrain efficiency as a function of engine speed, the powertrain efficiency is maximized using any effective method of maximizing an equation variable—e.g., numerical methods, iterative processes, derivatives, etc.

The powertrain efficiency is maximized at a certain value of the engine speed: this is the optimized engine speed for those values of the vehicle operating parameters. To the extent that the "one set of values" used in the algorithm is the set values of the vehicle operating parameters representing current operating conditions, the determined optimized engine speed is the final result, and may be used as described below. This information can then be stored in the control system, and the steps repeated so that a number of optimized engine speeds are determined for different operating conditions. In this way, the optimized engine speed is calculated online and stored in a control system to create a four-dimensional data map such as described above. When enough information is stored, the method may rely on use of the data maps, rather than generating a new value for the optimized engine speed using the equations. Use of the data maps may reduce processing requirements and free-up control system resources as compared to calculating the maximum efficiency and optimized engine speed for each new set of operating conditions.

Figure 4:
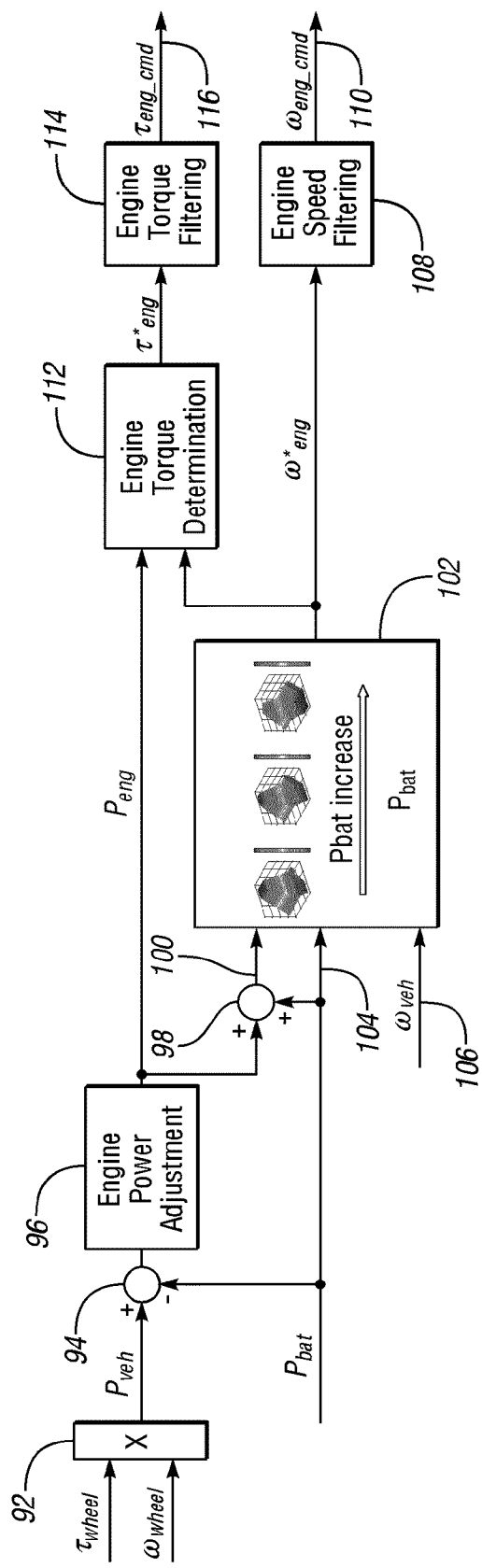
FIG. 4 shows a control diagram utilizing a four-dimensional data map such as illustrated in FIG. 3 in accordance with embodiments of the present invention.

FIG. 4 shows a control system diagram of an implementation of embodiments of the invention. Wheel torque and speed are input to an operator 92 to output a vehicle power ($P_{veh}$). The inputs may be, for example, desired values obtained by vehicle operator inputs, such as an accelerator position, transmission selection, and brake pedal position. The battery power ($P_{bat}$) is combined with the vehicle power at summing junction 94 to yield an engine power. This raw value of the engine power is, in this embodiment, adjusted at block 96, which may include an engine power limit check and other adjustments, for example, an adjustment based on a closed loop battery power control.

The adjusted engine power ($P_{eng}$) is combined with the battery power at junction 98 to provide an input 100 of vehicle power ($P_{veh}$) into a four-dimensional table, or data map 102. One example of such a data table or data map is the data map 84 shown in FIG. 3, which, as described above, may be preprogrammed into a vehicle controller, such as the VSC 46. Another input 104 into the data map 102 is the battery power itself ($P_{bat}$). A third input into the data map 102 is provided at 106, and is a vehicle speed. The inputs 100, 104, 106 represent current values, or "given values", of the vehicle operating parameters obtained during vehicle operation. Output from the data map 102, for example, output from the VSC 46 to the engine 10 and/or TCM 58, is the optimized engine speed ($\omega^*_e$).

Thus, embodiments of the invention may be described as a method that includes the steps of: (1) inputting into a control system of the vehicle current values of a plurality of vehicle operating parameters, including a power of the electrical power source, where the control system is programmed to output optimized engine speeds corresponding to respective values of the vehicle operating parameters, and (2) outputting the optimized engine speed corresponding to the current values of the vehicle operating parameters. As noted above, this may be accomplished with predetermined data maps, or with an algorithm or algorithms that generate the optimized engine speed by executing the applicable equations in real time while the vehicle is operating.

Returning to FIG. 4, the optimized engine speed is filtered at 108 using a signal filter, and is output as an engine speed command 110. The optimized engine speed is also combined with the engine power at 112, which was fed forward from the engine power adjustment at 96, to generate an optimized engine torque ($\tau^*_{eng}$). The optimized engine torque is filtered at 114 to generate an engine torque command 116.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed:

1. A method for optimizing powertrain efficiency in a vehicle, the powertrain including an engine, an electric machine operable to output torque to at least one vehicle wheel, and an electrical power source operable to provide electrical power to the electric machine, the method comprising:
generating a plurality of three-dimensional maps of optimized engine speeds for combinations of vehicle power and vehicle speed at a plurality of predetermined powers of the electrical power source, each of the maps corresponding to one of the predetermined powers of the electrical power source; and
using the maps to determine an optimized engine speed for a given power of the electrical power source, a given vehicle power and a given vehicle speed.

2. The method of claim 1, wherein the vehicle includes a control system including at least one controller, and the maps are programmed into the control system to create a four-dimensional map defined by values of: the vehicle power, the vehicle speed, the power of the electrical power source, and the optimized engine speed.

3. The method of claim 2, wherein the three-dimensional maps are generated offline prior to being programmed into the control system.

4. The method of claim 1, wherein the optimized engine speeds used in the three-dimensional maps are generated from a powertrain efficiency equation that is a function of at least the engine speed, the vehicle power, the vehicle speed, and the power of the electrical power source, each of the optimized engine speeds corresponding to an engine speed value that maximizes the powertrain efficiency for a given combination of vehicle power, vehicle speed, and power of the electrical power source.

5. The method of claim 1, further comprising:
generating an engine power value based on the given vehicle power and the given power of the electrical power source; and
using the determined optimized engine speed and the generated engine power value to generate an engine torque value.

6. A method for optimizing powertrain efficiency in a vehicle, the powertrain including an engine, an electric machine operable to output torque to at least one vehicle wheel, and an electrical power source operable to provide electrical power to the electric machine, the method comprising:
determining a powertrain efficiency as a function of engine speed for one set of values of certain vehicle operating parameters, including a power of the electrical power source;
maximizing the powertrain efficiency for the one set of values; and
determining the optimized engine speed for the one set of values based on the maximized powertrain efficiencies.

7. The method of claim 6, wherein the one set of values is a set of current operating conditions for the certain vehicle operating parameters.

8. The method of claim 6, further comprising:
determining a powertrain efficiency as a function of engine speed for at least one other set of values for the certain vehicle operating parameters;
maximizing the powertrain efficiency for the at least one other set of values, each of the maximized powertrain efficiencies corresponding to an optimized engine speed for the respective set of values;
determining current values for the certain vehicle operating parameters; and
determining the optimized engine speed for the current values of the certain vehicle operating parameters based on the maximized powertrain efficiencies.

9. The method of claim 6, wherein the certain vehicle operating parameters further include a vehicle power and a vehicle speed.

10. The method of claim 9, further comprising:
generating an engine power value from the current values of the vehicle power and the power of the electrical power source; and
using the determined optimized engine speed and the generated engine power value to generate an engine torque value.

11. The method of claim 9, further comprising storing each of the sets of values and the corresponding optimized engine speeds in a multi-dimensional map, the step of determining the optimized engine speed for the current values of the vehicle operating parameters including locating the current values of the vehicle operating parameters on the multi-dimensional map and determining the corresponding optimized engine speed.

12. The method of claim 9, wherein the vehicle includes a control system having at least one controller, the method further comprising programming into the control system the optimized engine speeds and the respective sets of values for the certain vehicle operating parameters.

13. The method of claim 12, wherein the steps of determining the powertrain efficiencies and maximizing the powertrain efficiencies are performed offline prior to being programmed into the control system.

14. A method for optimizing powertrain efficiency in a vehicle, the powertrain including an engine, an electric machine operable to output torque to at least one vehicle wheel, and an electrical power source operable to provide electrical power to the electric machine, the method comprising:

inputting into a control system of the vehicle current values of a plurality of vehicle operating parameters, including a power of the electrical power source, the control system being programmed to output optimized engine speeds corresponding to respective values of the vehicle operating parameters; and outputting the optimized engine speed corresponding to the current values of the vehicle operating parameters.

15. The method of claim 14, wherein the optimized engine speed is defined as an engine speed that maximizes powertrain efficiency for a given set of values of the vehicle operating parameters.

16. The method of claim 15, wherein the vehicle operating parameters further include a vehicle power and a vehicle speed.

17. The method of claim 16, further comprising:

generating an engine power value from the current values of the vehicle power and the power of the electrical power source; and using the determined output engine speed and the generated engine power value to generate an engine torque value.

18. The method of claim 16, further comprising:

determining optimized engine speeds corresponding to different combinations of the vehicle operating parameters; and programming the optimized engine speeds and respective combinations of the vehicle operating parameters into the control system for later retrieval.

19. The method of claim 18, wherein the step of determining the optimized engine speeds corresponding to different combinations of the vehicle operating parameters is performed offline prior to programming the optimized engine speeds and respective combinations of the vehicle operating parameters into the control system.

\* \* \* \* \*

UNITED STATES PATENT AND TRADEMARK OFFICE
CERTIFICATE OF CORRECTION

PATENT NO. : 8,103,397 B2  
APPLICATION NO. : 12/797964  
DATED : January 24, 2012  
INVENTOR(S) : Liang et al.

Page 1 of 1

It is certified that error appears in the above-identified patent and that said Letters Patent is hereby corrected as shown below:

In the claims
Column 10, Line 5, Claim 17:
After "using the" delete "determined" and after "output" insert -- optimized --.

Signed and Sealed this
Twenty-fourth Day of May, 2016

Michelle K. Lee
*Director of the United States Patent and Trademark Office*